United States Patent
Yata et al.

(10) Patent No.: US 6,691,311 B1
(45) Date of Patent: Feb. 10, 2004

(54) DIGITAL SIGNAL RECEIVING APPARATUS AND RECEIVING METHOD

(75) Inventors: Haruhiko Yata, Tokyo (JP); Yuichiro Nakamura, Kanagawa (JP); Hirofumi Yuchi, Kanagawa (JP)

(73) Assignee: Sony Corporation (JP)

( * ) Notice: Subject to any disclaimer, the term of this patent is extended or adjusted under 35 U.S.C. 154(b) by 0 days.

(21) Appl. No.: 09/499,993

(22) Filed: Feb. 8, 2000

(30) Foreign Application Priority Data

Feb. 12, 1999 (JP) ......................................... P11-034812
Feb. 12, 1999 (JP) ......................................... P11-304813

(51) Int. Cl.$^7$ .......................... H04N 7/20; H04N 3/445; H04N 7/173; H04N 7/16; G06F 3/00; G06F 13/00
(52) U.S. Cl. ............................. 725/68; 725/48; 725/49; 725/50; 725/54; 725/56; 725/59; 725/70; 725/71; 725/131; 725/139; 725/151; 725/38
(58) Field of Search ............................. 725/48, 49, 53, 725/56, 37–39, 50, 54, 59, 131–134, 139–142, 151–153, 68–72

(56) References Cited

U.S. PATENT DOCUMENTS

| | | | | |
|---|---|---|---|---|
| 5,600,378 A | * | 2/1997 | Wasilewski | 348/468 |
| 5,943,605 A | * | 8/1999 | Koepele, Jr. | 725/114 |
| 6,040,850 A | * | 3/2000 | Un et al. | 725/68 |
| 6,480,551 B1 | * | 11/2002 | Ohishi et al. | 375/260 |
| 6,483,547 B1 | * | 11/2002 | Eyer | 348/473 |

* cited by examiner

*Primary Examiner*—John Miller
*Assistant Examiner*—Michael W. Hoye
(74) *Attorney, Agent, or Firm*—Lerner, David, Littenberg, Krumholz & Mentlik, LLP

(57) ABSTRACT

A digital signal receiving apparatus for receiving a digital broadcast signal having a first information table and a second information table is disclosed, the first information table representing the relation between physical information of transmission paths and deliverable data, the second information table representing deliverable data, the apparatus comprising a means for successively searching services represented with the second information table, a means for generating a list that represents services represented with the first information table, and a means for performing a predetermined process corresponding to the generated list.

9 Claims, 18 Drawing Sheets

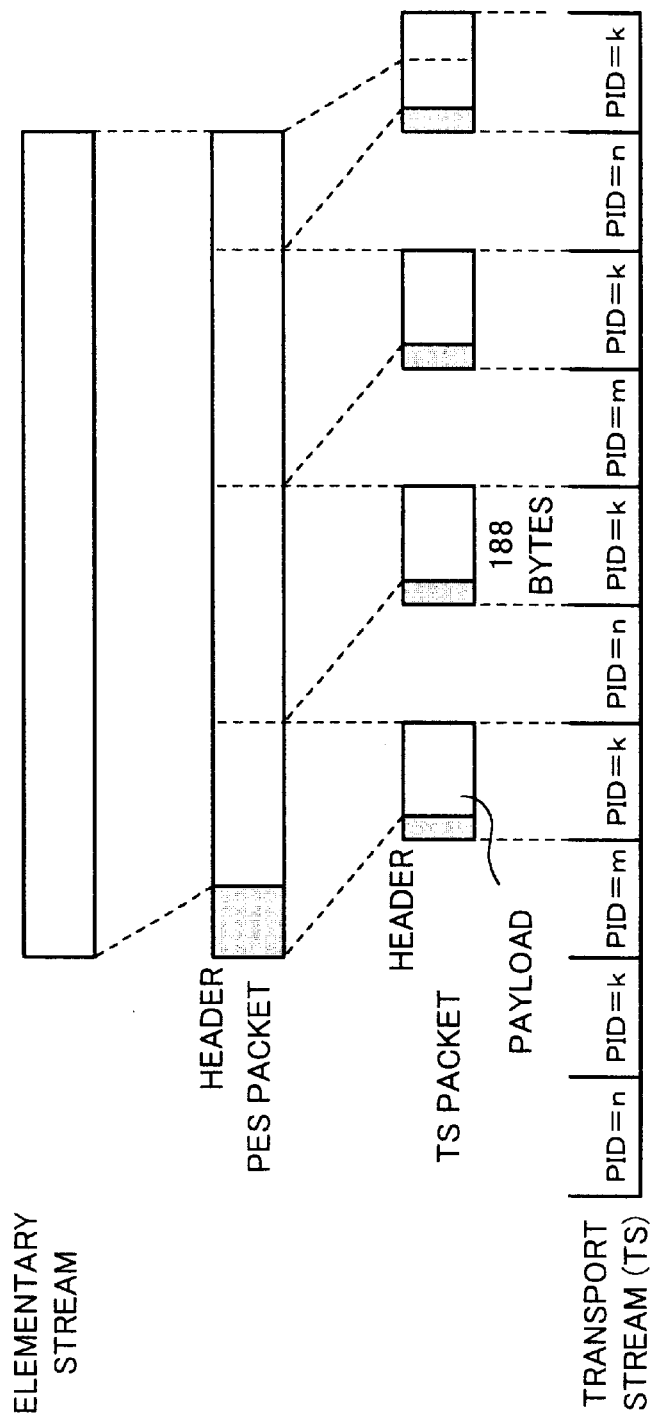

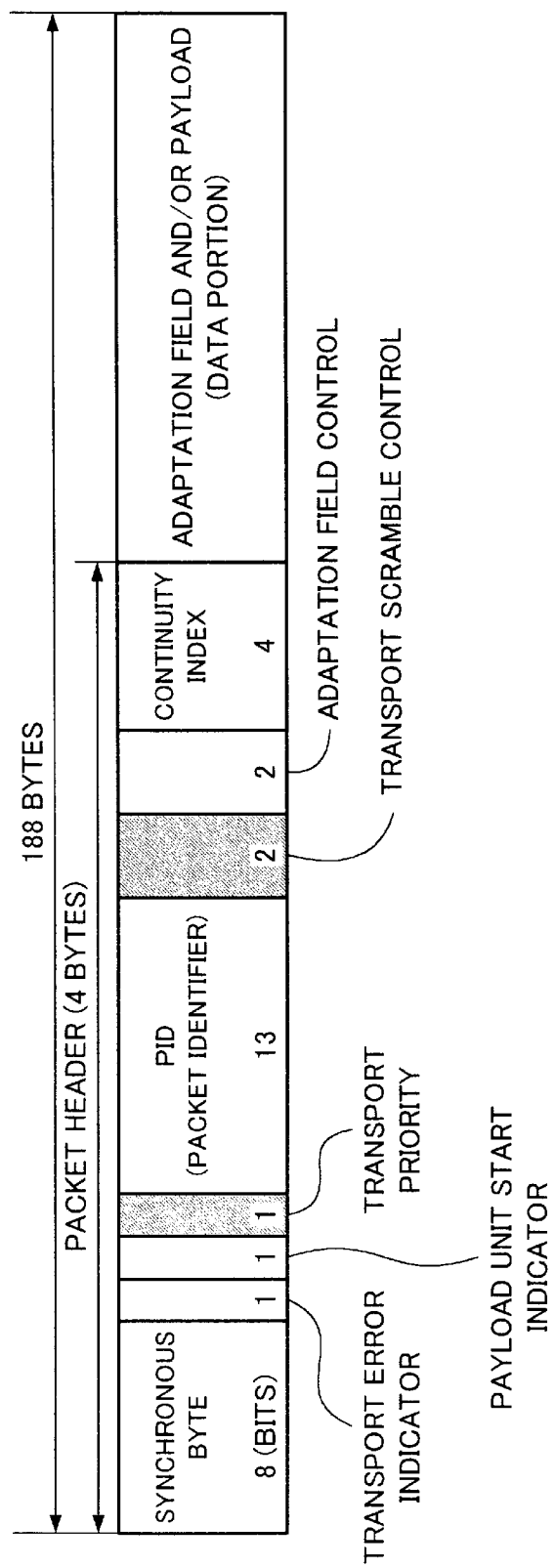

Fig. 11A

| 111ch |
|---|
| 222ch |
| 333ch |
| 444ch |
| 555ch |
| 666ch |
| 777ch |

Fig. 11B

| 111ch |
|---|
| 222ch |
| 333ch |
| 555ch |
| 666ch |
| 777ch |
| |

Fig. 11C

| EPG DATA OF CH 111 |
|---|
| EPG DATA OF CH 222 |
| EPG DATA OF CH 333 |
| EPG DATA OF CH 555 |
| EPG DATA OF CH 666 |
| EPG DATA OF CH 777 |
| |

Fig. 12

| 111ch | PROGRAM A |
|---|---|
| 222ch | PROGRAM B |
| 333ch | PROGRAM C |
| 444ch | NOT SERVICED |
| 555ch | PROGRAM E |
| 666ch | PROGRAM F |
| 777ch | PROGRAM G |

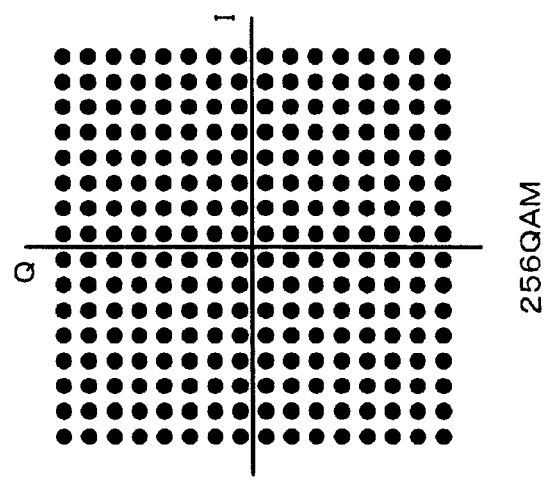
Fig. 14C  256QAM
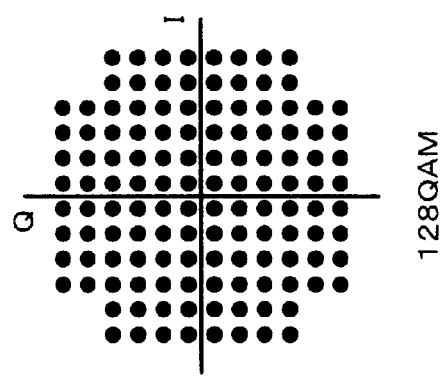
Fig. 14B  128QAM
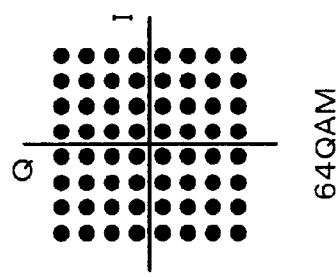
Fig. 14A  64QAM

Fig. 17A

| |
|---|
| 111ch |
| 333ch |
| 444ch |
| 666ch |
| 777ch |
| |

Fig. 17B

| |
|---|
| 111ch |
| 222ch |
| 333ch |
| 555ch |
| 666ch |
| 777ch |

Fig. 17C

| |
|---|
| EPG DATA OF CH 111 |
| EPG DATA OF CH 222 |
| EPG DATA OF CH 333 |
| EPG DATA OF CH 555 |
| EPG DATA OF CH 666 |
| EPG DATA OF CH 777 |

Fig. 18

| | |
|---|---|
| 111ch | PROGRAM A |
| 333ch | PROGRAM C |
| 444ch | NOT SERVICED |
| 666ch | PROGRAM F |
| 777ch | PROGRAM G |

DIGITAL SIGNAL RECEIVING APPARATUS AND RECEIVING METHOD

BACKGROUND OF THE INVENTION

1. Field of the Invention

The present invention relates to a digital signal receiving apparatus and a receiving method for receiving for example a digital satellite broadcast and re-transmitting the received signals through a digital cable broadcast.

2. Description of the Related Art

In CS (Communication Satellite) digital broadcast signals for video data, audio data, and/or text data, NIT (Network Information Table) list only services that are being broadcast. Services listed in NIT, not in PAT and/or EIT are treated as those that are stopped by an STB (Set Top Box) or the like.

When a digital CS broadcast is received and re-transmitted through a digital cable broadcast, there may be services listed in PAT and/or EIT, not in NIT. Such a situation does not take place in a digital CS broadcast. In a digital cable broadcast STB or the like, when the same process as a digital satellite broadcast STB is performed, a malfunction or a delay of operation may result in.

OBJECTS AND SUMMARY OF THE INVENTION

An object of the present invention is to provide a digital signal receiving apparatus and a receiving method that normally operate even if there is a service listed in PAT and/or EIT, not in NIT.

A first aspect of the present invention is a digital signal receiving apparatus for receiving a digital broadcast signal having a first information table and a second information tale, the first information table representing the relation between physical information of transmission paths and deliverable data, the second information table representing deliverable data, the apparatus comprising a means for successively searching services represented with the second information table, a means for generating a list that represents services represented with the first information table, and a means for performing a predetermined process corresponding to the generated list.

A second aspect of the present invention is a digital signal receiving method for receiving a digital broadcast signal having a first information table and a second information table, the first information table representing the relation between physical information of transmission paths and deliverable data, the second information table representing deliverable data, the method comprising the steps of (a) successively searching services represented with the second information table, (b) generating a list that represents services represented with the first information table from those searched at step (a), and (c) performing a predetermined process corresponding to the generated list.

According to the present invention, among services listed in PAT and/or EIT as information with respect to deliverable data, a list for those in an information table such as NIT that represents the relation between physical information of transmission paths and deliverable data is generated. Corresponding to the list, a process for displaying EPG can be performed.

These and other objects, features and advantages of the present invention will become more apparent in light of the following detailed description of a best mode embodiment thereof, as illustrated in the accompanying drawings.

BRIEF DESCRIPTION OF THE DRAWINGS

FIG. 2 is a schematic diagram for explaining a multimedia multiplexing system with TS of MPEG2;

FIG. 3 is a schematic diagram for explaining the structure of a TS packet of MPEG2 shown in FIG. 2;

FIGS. 11A, 11B, and 11C are schematic diagrams showing the case that there are services listed in NIT, not in PAT and/or EIT;

FIG. 12 is a schematic diagram showing an example of EPG displayed in the case shown in FIGS. 11A, 11B, and 11C;

FIGS. 14A, 14B, and 14C are schematic diagrams for explaining a modulation method of a digital cable broadcast;

FIGS. 17A, 17B, and 17C are schematic diagrams showing an example of the case that there are service listed in PAT and/or EIT, not in NIT;

FIG. 18 is a schematic diagram showing an example of EPG displayed corresponding to the result of the process shown in FIGS. 17A, 17B, and 17C;

DETAILED DESCRIPTION OF THE PREFERRED EMBODIMENTS

Figure 1:
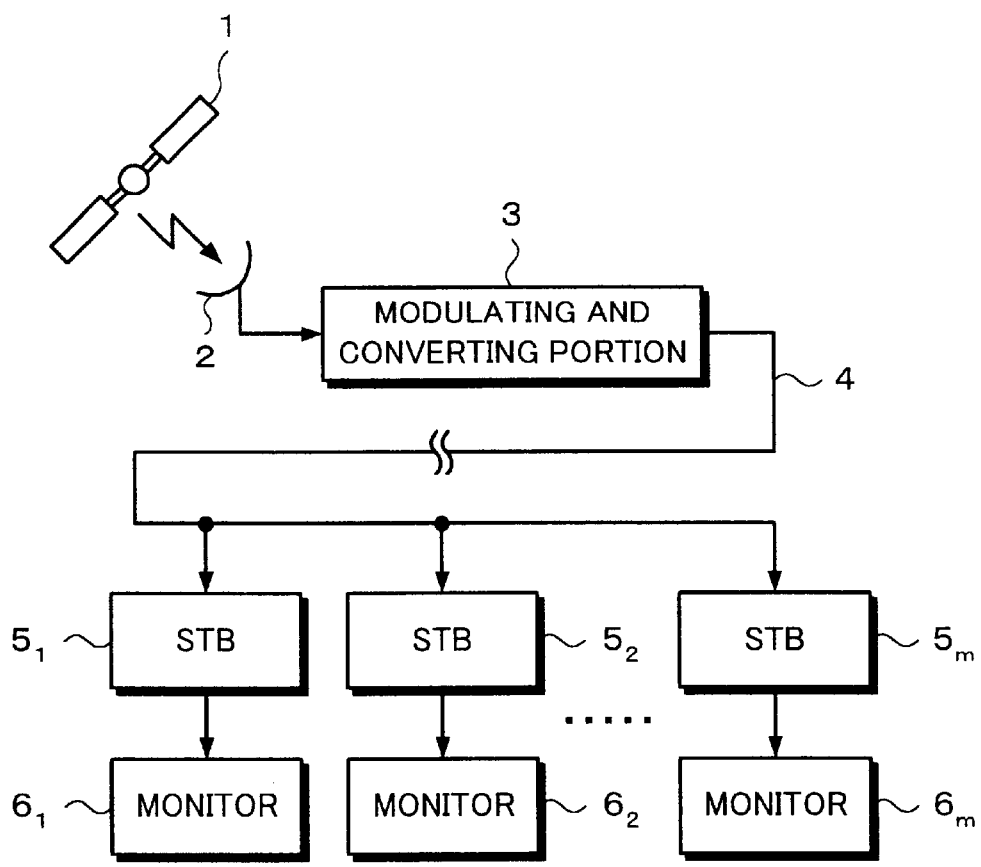
FIG. 1 is a schematic diagram showing an example of the structure of a digital signal transmitting system that receives a digital CS broadcast and re-transmits it through a digital cable broadcast.

FIG. 1 shows an example of the structure of a digital signal transmitting system that receives a digital satellite broadcast and re-transmits it through a digital cable broadcast. In FIG. 1, a satellite 1 has a plurality of transponders (satellite repeaters). An antenna 2 receives digital broadcast signals from the transponders. A modulating and converting portion 3 receives the digital broadcast signals from the antenna 2, changes the transmission frequencies and the modulation methods of the digital broadcast signals corresponding to the digital cable broadcast and so forth, and then transmits the resultant signals to a transmission path 4. The transmission path 4 is connected to receivers STB $5_1$, $5_2$, ..., and $5_m$. The STB $5_1$, $5_2$, ..., and $5_m$ are connected to monitors $6_1$, $6_2$ and $6_m$, respectively. Programs selected by the individual STBs are displayed on the respective monitors. Next, a digital broadcast signal will be described. In this example, a digital broadcast signal corresponding to a DVB (Digital Video Broadcasting) system as the European digital broadcasting standard will be described. FIG. 2 shows an example of the signal format corresponding to a multimedia multiplexing method using TS (Transport Stream) of MPEG (Moving Picture Experts Group) 2. Data of each medium (video data, audio data, and so forth) is composed of variable length packets referred to as PES (Packetized Elementary Streams) packets. Each PES packet is divided into several transport stream packets (hereinafter referred to as TS packets). Each TS packet is composed of a header and a payload area.

With reference to FIG. 3, the structure of a TS packet corresponding to MPEG2 will be described in detail. One packet is composed of 188 bytes. The first four bytes (namely, 32 bits) are used as a packet header. One byte (namely, eight bits) of the packet header is a synchronous byte. Corresponding to the synchronous byte, a decoder detects the top of the TS packet. As a pattern of the synchronous byte, for example 47H' (H: hexadecimal notation) is used. As a transport error indicator that represents whether the current TS has an error, one bit is used. In addition, as a payload unit start indicator that represents that the new PES packet starts with the current TS packet, one bit is used.

In addition, as a transport priority bit that represents the importance of the TS packet, one bit is used. As PID (Packet Identifier) that is an identifier of a TS packet, 13 bits are used. The identification number of the TS packet contained in PID represents the attribute of a stream of the current packet. The STB $5_1$ to $5_m$ identify data of each medium with reference to PID. As transport scramble control information that represents the scrambling state and scramble type of the payload of the current TS packet, two bits are used.

As adaptation field control information that represents the presence/absence of the adaptation field of the current TS packet and the presence/absence of the payload thereof, two bits are used. As continuity index information that represents whether or not a packet having the same PID has been discarded, four bits are used. It is determined whether or not such a packet has been discarded corresponding to the continuity of cyclic count information of four bits.

As the payload area, 184 bytes other than the packet header are used. The payload area is used for data (video data, audio data, and so forth) delivered to the user, PSI (Program Specific Information), SI (Service Information), and so forth. PSI and SI will be described later in detail.

Figure 4A:
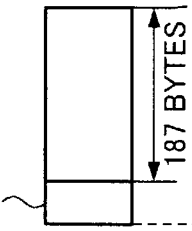
FIGS. 4A and 4B are schematic diagrams for explaining the frame structure of a DVB system.
Figure 4B:
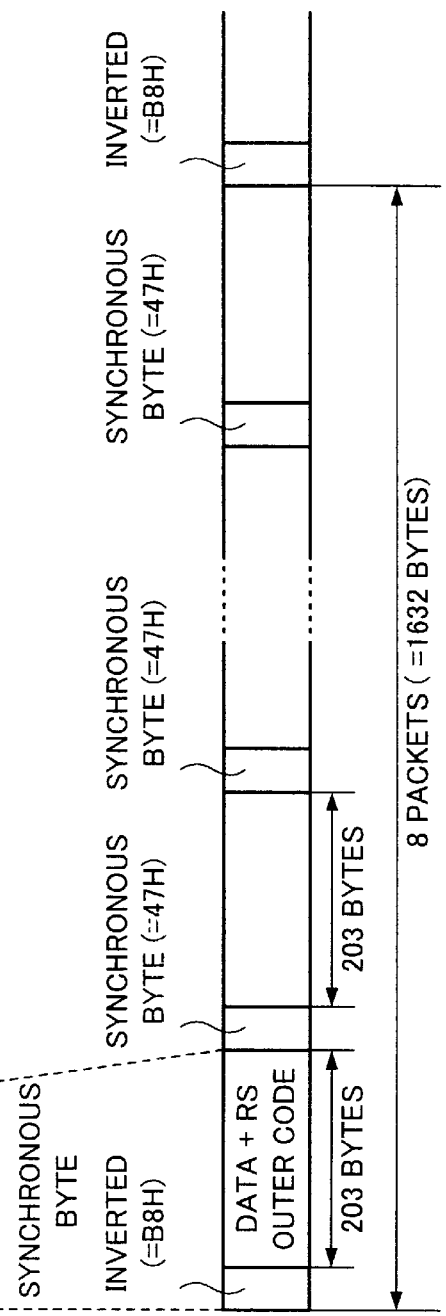

FIGS. 4A and 4B show the frame structure of digital broadcast data of the DVB system. FIG. 4A shows the structure of a TS packet of MPEG2. FIG. 4B shows the structure of one frame composed of eight TS packets of MPEG2. Reed-Solomon error correction code is added to data of each TS packet. Thus, one packet is composed of 204 bytes. The synchronous byte is inverted every eight packets so as to synchronize frames. When the synchronous byte is '47H', every eighth synchronous byte becomes 'B8H' every eight packets. Digital broadcast data shown in FIG. 4B is modulated corresponding to QPSK (Quadrature Phase Shift Keying) method.

Figure 5:
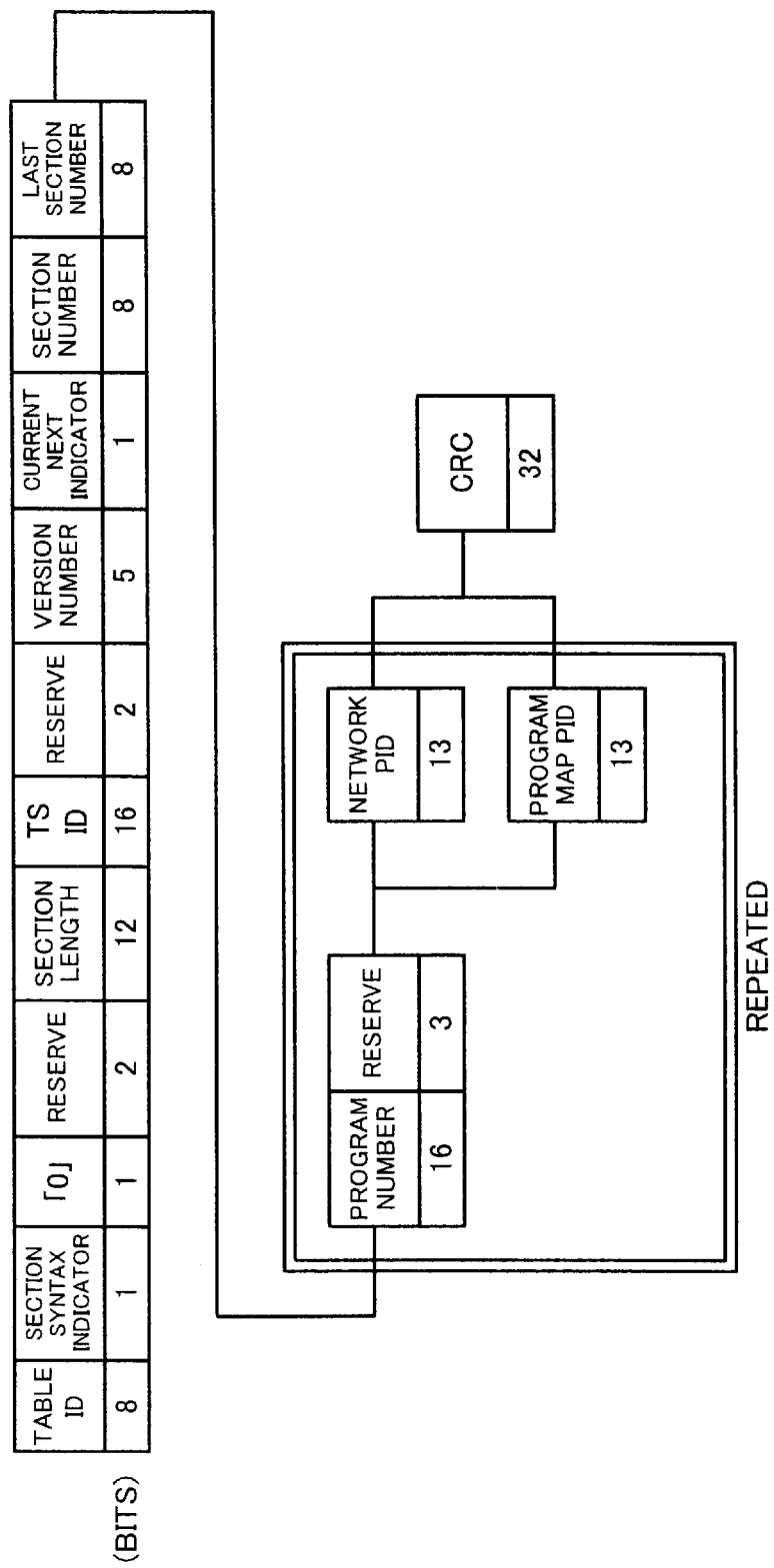
FIG. 5 is a schematic diagram for explaining the structure of PAT.

Next, PSI will be described. There are several types of PSI that are PAT (Program Association Table), PMT (Program Map Table), NIT (Network Information Table), and so forth. PAT is an information table of which fixed information of individual carrier is multiplexed. In other words, PAT lists channel information for each carrier and PID of PMT of each channel. PMT will be described later in detail. FIG. 5 shows an example of the data structure of PAT. Table ID represents the type of the table. Table ID of PAT is '0x0000' (fixed value) (where 0x represents hexadecimal notation). Section Syntax Indicator (one bit) represents whether the header of the current section is a long form or a short form. Reserve (two bits) represent a flag that will be assigned in future.

Section Length (12 bits) represents the section length of the rest of PAT (in bytes). Section Length includes CRC (Cyclic Redundancy Code). TS ID (16 bits) identifies a transport stream (multiplexed encoded data). In the case of a satellite, TS ID represents a transponder. Version Number (five bytes) represents a PAT version. Whenever the information in PAT is updated, Version Number is also updated. Current Next Indicator (one byte) represents a version of PAT in the case that new and old versions of PAT are transmitted at a time. Section Number (eight bits) represents a section number. Section Number of the first section is '0x00'. Section Number is incremented by 1 from '0x00'. Last Section Number (eight bits) represents the section number of the last section of the same sub table.

A block with dual lines is repeatedly placed. This block has Program Number (16 bits), Reserve (three bits), Network PID (13 bits), and Program Map (13 bits). Program Number represents an individual channel identification number. Network PID represents PID of NIT in the case that the program number is '0x0000'. Program Number Map PID represents PID corresponding to PMT (that will be described later). CRC is an error correction code for all the section.

Figure 6:
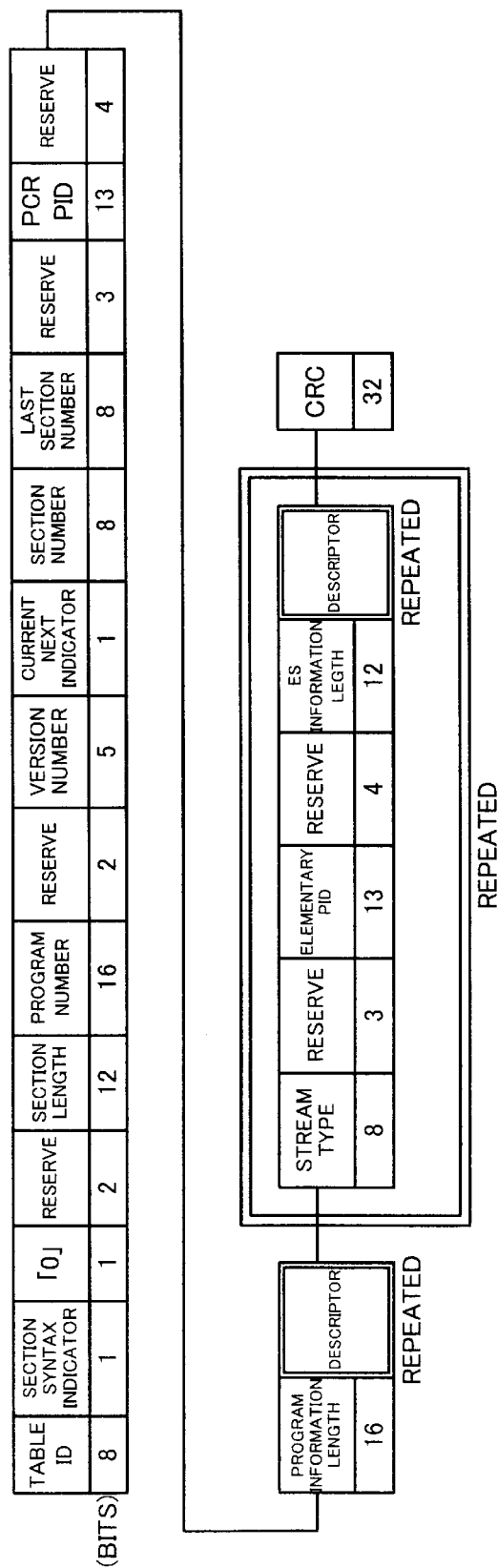
FIG. 6 is a schematic diagram for explaining the structure of PMT.

PMT is an information table of which information of each channel is multiplexed. In other words, PMT lists PID of packets of streams of video data, audio data, and additional data that compose individual channels and PID of ECM (Encryption Control Message) packets necessary for descrambling scrambled data. As described above, PID of PMT is designated by PAT. FIG. 6 shows an example of the data structure of PMT. For simplicity, in PID of PMT, the description of the same data fields as PAT is omitted. Table ID (eight bits) represents the type of the table. The table ID of PMT is '0x02'. PCR (Program Clock Reference: reference value of time recognizing means in the program) PID (13 bits) represents PID of a packet that contains a clock signal that is a reference with which data is decoded. Program Information Length (12 bits) represents information in common with a loop that immediately follows. Descriptor complements the information of the section. Descriptor is repeatedly placed.

In addition, a block with dual lines is repeatedly placed. The block has Stream Type (eight bits), Reserve (three bits), Elementary PID (13 bits), Reserve (four bits), ES Information Length (12 bits), and Descriptor. Descriptor is repeated in the block. Program Number is a channel identification number. Stream Type represents the type of a signal of a stream such as video data, audio data, or additional data. Elementary PID represents PID of the elementary stream. ES Information Length represents information of the elementary stream of the loop that immediately follows.

NIT is an information table correlates information of transmission paths and services that are broadcast. In other words, NIT contains physical information for each carrier (for example, the orbit of the satellite, polarized waves, carrier frequencies of individual transponders, convolution rates, and list of channels multiplexed on each carrier). PID of NIT is '0x0010'. Although the detailed data structures of PAT and PMT are defined in MPEG2, only the necessity of NIT is defined. Thus, the data structure of NIT is privately defined.

Figure 7:
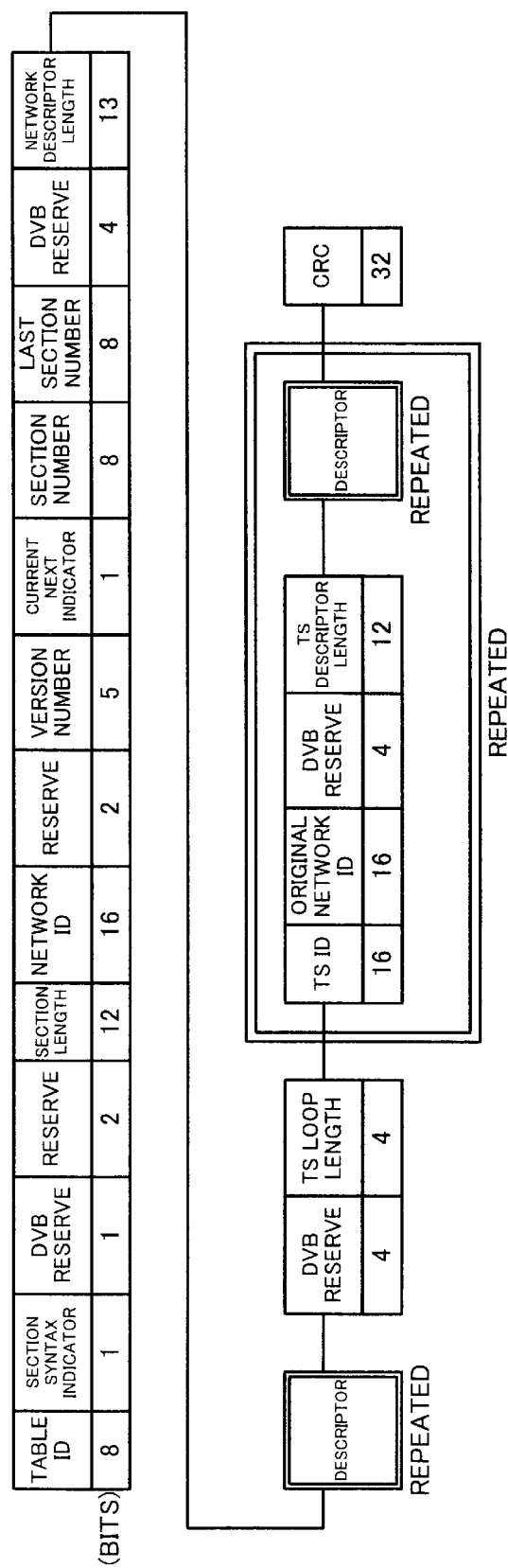
FIG. 7 is a schematic diagram for explaining the structure of NIT.

FIG. 7 shows an example of the data structure of NIT. For simplicity, in FIG. 7, the description of the same data fields as PAT and PMT shown in FIGS. 5 and 6 is omitted. Table ID (eight bits) represents the type of the table. Table ID of the current network is '0x40'. Table ID of another network is '0x41'. Network ID (16 bits) identifies a network. In the case of a satellite broadcast, Table ID represents a satellite. Network Descriptor Length (13 bits) represents common information of the network of the loop that immediately follows. TS Loop Length represents transport streams of the network of the loop that immediately follows. A block with dual lines has TS Descriptor Length (12 bits). TS Descriptor Length lists information of transport streams of the loop that immediately follows.

Figure 8:
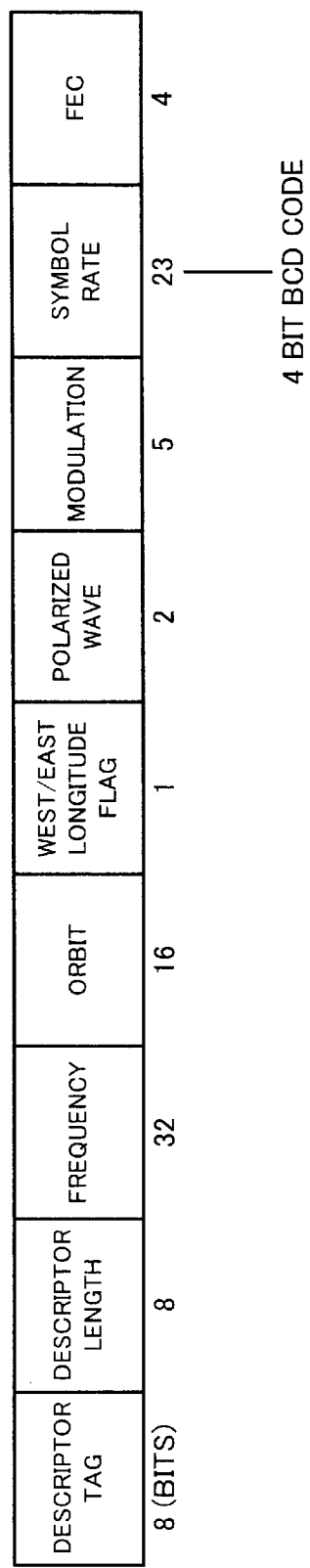
FIG. 8 is a schematic diagram for explaining the structure of Satellite Delivery System Descriptor.

Next, with reference to FIG. 8, Satellite Delivery System Descriptor will be described. Satellite Delivery System Descriptor is used as the first descriptor of those repeated corresponding to TS Descriptor Length (see FIG. 7). Satellite Delivery System Descriptor is paired with TS ID. Descriptor Tag (eight bits) is defined in DVB. Descriptor Tag represents the type of a descriptor. Descriptor Tag of Satellite Delivery System Descriptor is '0x43'. Descriptor Length (eight bits) represents the data length of the descriptor. Frequency (32 bits) represents the transmission frequency of the current stream (in this case, the current transponder). Orbit (16 bits) represents the longitude of the orbit position of the satellite.

West/East Longitude Flag (one bit) represents west/east longitude of the orbit position of the satellite. Polarized Wave (two bits) represents the polarized wave of the current transmission signal (for example, '00', '01', '10', and '11' of Polarized Wave represent a horizontal straight line, a vertical straight line, a left convoluted circle, and a right convoluted circle, respectively). Modulation (five bits) represents a modulation method. When Modulation is '0001', it represents QPSK. Symbol Rate (32 bits) represents a symbol rate. FEC (Forward Error Correction) (four bits) represents a convolution rate.

Figure 9:
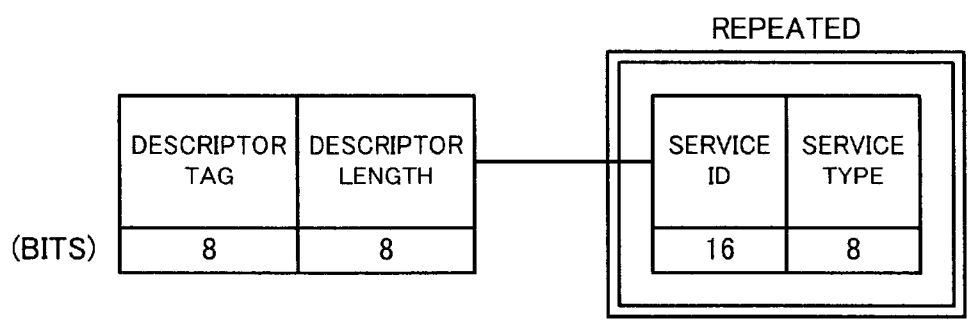
FIG. 9 is a schematic diagram for explaining the structure of Service List Descriptor.

Next, with reference to FIG. 9, Service List Descriptor will be described. Service List Descriptor is as the second or later descriptor of those repeated corresponding to TS Descriptor Length (see FIG. 7). Service List Descriptor represents ID of multiplexed services (channels) of the current stream (transponder). In other words, each TS ID has Service List Descriptor. Descriptor Tag (eight bits) is defined in DVB. Descriptor Tag represents the type of the descriptor. Descriptor Tag of Service List Descriptor is '0x41'.

Service ID (16 bits) identifies a service. Normally, a service is equivalent to a channel selected by the user. Service Type represents the type of a service such as video data, audio data, information data, and so forth. When Service Type is '0x01', it represents a digital TV service. When Service Type is '0x02', it represents a digital audio service. When Service Type is '0x03', it represents a teletext service. When Service Type is '0x04', it represents a NVOD basic service. Service Type includes codes for user definition and reserve.

Figure 10:
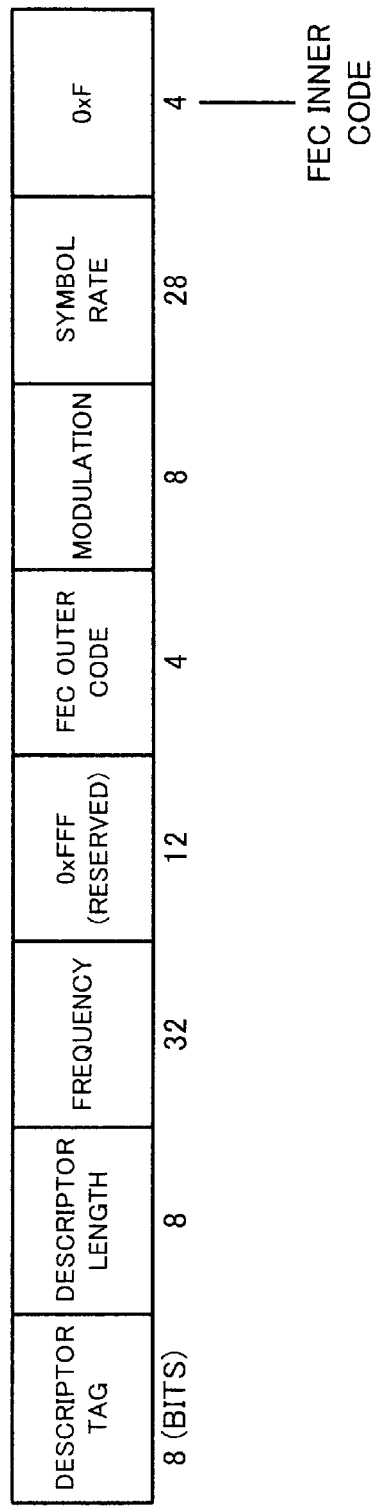
FIG. 10 is a schematic diagram for explaining the structure of Cable Delivery System Descriptor.

Next, with reference to FIG. 10, Cable Delivery System Descriptor will be described. For simplicity, in FIG. 10, the description of the same data fields as Satellite Delivery System Descriptor shown in FIG. 8 is omitted. Descriptor Tag is defined in DVB. Descriptor Tag represents the type of the descriptor. Descriptor Tag of Cable Delivery System Descriptor is '0x44'. Frequency (32 bits) represents the transmission frequency for each stream of the cable digital broadcast (namely, each channel of the digital cable broadcast).

FEC (Forward Error Correction) Outer Code (4 bits) is an error correction code as an outer code. When FEC Outer Code is '0010', as an outer code, Reed-Solomon code is used. Modulation (eight bits) represents a modulation method. When Modulation is '0x03', as a modulation method, 64-symbol QAM is used. Symbol Rate (28 bits) represents a symbol rate. FEC Inner Code (four bits) represents a convolution rate.

Next, SI will be described. SI is a section type table listing information of channels and services. There are several types of SI that are SDT (Service Description Table), EIT (Event Information Table), and so forth. SDT lists channel information such as channel numbers, channel names, channel guides, and channel logo marks. EIT lists service information such as channel numbers, service numbers, program start time, program duration, service names, summarized stories, service genres, and viewer age restrictions.

Corresponding to information of SI, EPG (Electronic Program Guide) is generated. EPG is displayed on the monitors $6_1, 6_2, \ldots,$ and $6_m$ of STB $5_1, 5_2, \ldots,$ and $5_m$. Thus, the users can easily look for desired services.

Normally, services listed in NIT matches those listed in PAT, EIT, and so forth. However, in a CS digital broadcast that is being serviced, there may be services listed in only NIT, not in PAT and/or EIT. FIGS. 11A, 11B, and 11C show an example of such a situation.

When services listed in NIT are shown in FIG. 11A and services listed in PAT and/or EIT are shown in FIGS. 11B/11C, a service of channel 444 is listed in NIT, not in PAT and/or EIT. In this case, the STB $5_1$ to $5_m$ determine that the service of channel 444 is stopping and a relevant message is displayed on EPG (see FIG. 12).

In a digital cable broadcast, all services of a digital CS broadcast may not be re-transmitted. For example, when the satellite 1 has L transponders and the number of digital broadcast signals of the digital cable broadcast is M (where M<L), the M digital broadcast signals of the digital cable broadcast may be selectively used. In such a case, to delete information of services that are not re-transmitted, NIT is updated.

Figure 13:
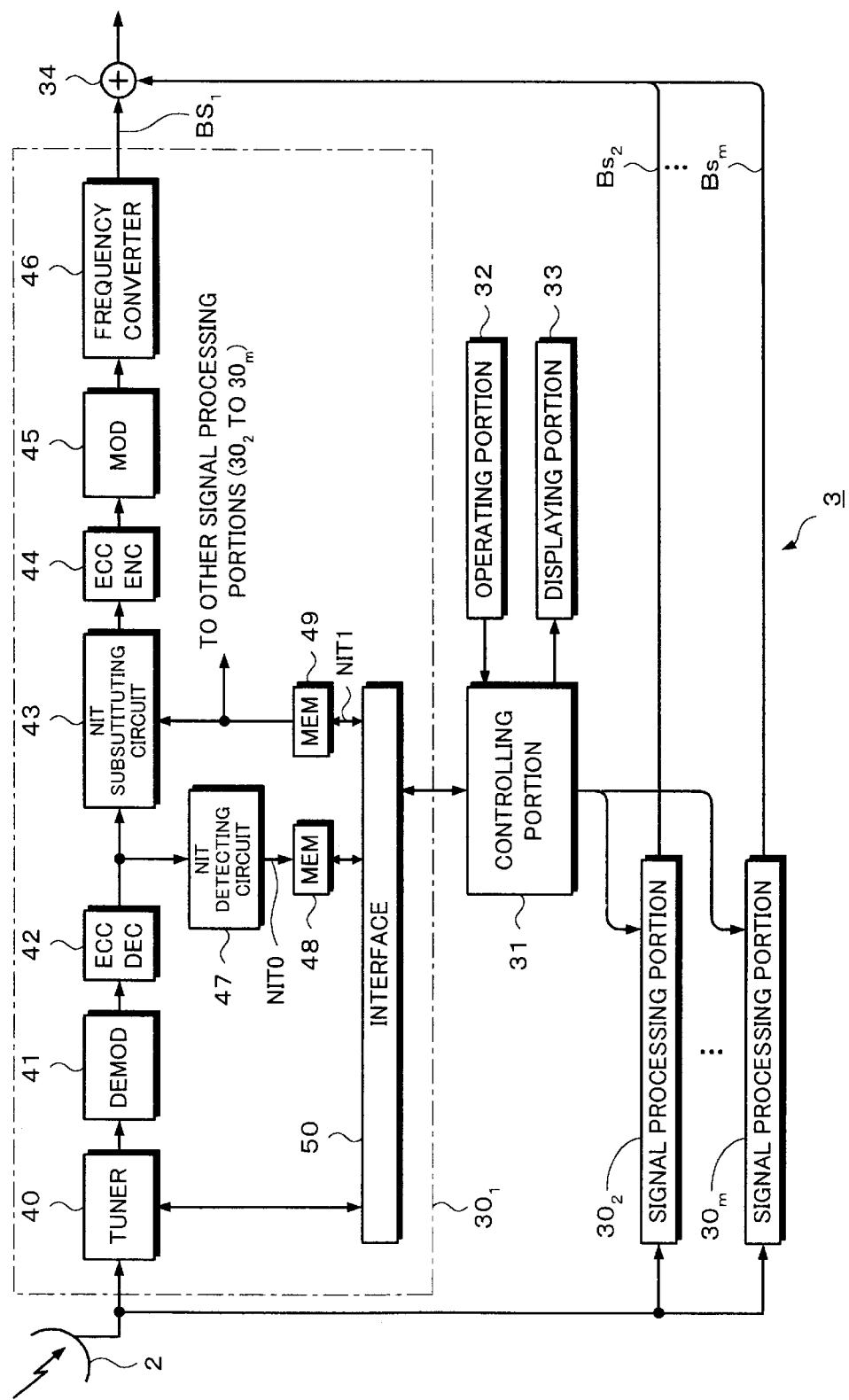
FIG. 13 is a block diagram showing an example of the structure of a modulating and converting portion.

FIG. 13 shows an example of the structure of a modulating and converting portion 3 that updates NIT. An SHF (Super High Frequency) band digital broadcast signal is supplied from a satellite 1 to signal processing portions $30_1$, $30_2, \ldots,$ and $30_m$ through an antenna 2. The signal processing portions $30_1, 30_2, \ldots,$ and $30_m$ convert the received signal into VHF (Very High Frequency) band or UHF (Ultra High Frequency) band cable digital broadcast signals $BS_1$ to $BS_m$. A controlling portion $3_1$ supplies predetermined signals to signal processing portions $30_1$, to $30_m$ to the signal processing portions $30_1$, to $30_m$ so as to control all operations of the apparatus. An operating portion 32 sets reception frequencies of tuners of the signal processing portions $30_1, 30_2, \ldots,$ and $30_m$. A displaying portion 33 displays the state of the apparatus. A mixer 34 mixes digital cable broadcast signals $BS_1$ to $BS_m$ that are output from the signal processing portions $30_1$, to $30_m$ and supplies the mixed signal to a transmission path 4.

Next, the structure of the signal processing portion 301 will be described in detail. A signal received from the antenna 2 is supplied to a tuner 40. The tuner 40 selects a digital broadcast signal transmitted from a first transponder from the received signal. The tuner 40 converts the frequency of the selected signal into a QPSK signal and supplies the generated QPSK signal to a demodulator 41. The demodulator 41 demodulates the QPSK signal received from the tuner 40 into a DVB frame signal. An output signal (DVB frame signal) of the demodulator 41 is supplied to an ECC (Error Correction Code) decoder 42.

The ECC decoder 42 performs an error correction process for the output signal of the demodulator 41 and generates a TS packet of MPEG2 as digital broadcast data and supplies the generated TS packet to an NIT substituting circuit 43 and an NIT detecting circuit 47. The NIT detecting circuit 47 detects NIT of the digital broadcast data that is received from the satellite 1 (hereinafter this NIT is referred to as NIT0) from the TS packet. The detected NIT0 is supplied to and stored in a memory 48.

The controlling portion 31 reads NIT0 from the memory 48 through an interface 50 and updates the service information in NIT0 to NIT1 for the digital cable broadcast. In other words, the controlling portion 31 converts Satellite Delivery System Descriptor (see FIG. 8) in NIT0 into Cable Delivery System Descriptor (see FIG. 10) as updated NIT (hereinafter referred to as NIT1). The generated NIT1 is supplied to a memory 49 through the interface 50. NIT1 is stored to the memory 49. The controlling portion 31 also controls the reception frequency of the tuner 40 through the interface 50.

As described above, when the number M of transponders of the satellite 1 is larger than the number L of channels of the digital cable broadcast and M digital broadcast signals are selectively used for the cable digital broadcast, the controlling portion 31 performs the following operation. In other words, the controlling portion 31 deletes information of digital broadcast signals that are not used in the digital cable broadcast (namely, TS ID and Descriptor shown in FIG. 7) so as to update NIT0 to NIT1.

The substituting circuit 43 substitutes NIT0 in a TS packet received from the ECC decoder 42 into NIT1 that is read from the memory 49 and outputs the resultant TS packet of MPEG2 to an ECC encoder 44. The NIT substituting circuit 43 performs a process for inserting dummy bits in an area of which information of TS ID has been deleted.

The ECC encoder 44 adds a Reed-Solomon error correction code to an output signal of the NIT substituting circuit 43 and converts the resultant signal into a DVB frame signal. An output signal of the ECC encoder 44 is supplied to a modulator 45. The modulator 45 modulates the output signal of the ECC encoder 44 corresponding to 64-symbol QAM (Quadrature Amplitude Modulation) method. An output signal of the modulator 45 is supplied to a frequency converter 46. The frequency converter 46 converts the output signal of the modulator 45 into a VHS band/UHF band frequency signal and supplies the resultant signal BS1 to the mixer 34.

Each of the signal processing portions $30_2$ to $30_m$ may be composed of a circuit block of which the NIT detecting circuit 47, the memory 48, and the memory 49 are deleted from the signal processing portion $30_1$. The signal processing portions $30_2$ to $30_m$ select digital broadcast signals corresponding to the second to m-th transponders of the satellite from an output signal of the antenna 2. When necessary, the signal processing portions $30_2$ to $30_m$ read NIT1 from the memory 49 so as to substitute NIT0 with NIT1. The signal processing portions $30_2$ to $30_m$ supplies the resultant signals with different transmission frequencies $BS_2$ to $BS_m$ to the mixer 34.

As described above, in a digital CS broadcast, QPSK (Quadrature Phase Shift Keying) method is used. For example, in a particular digital CS broadcast, a broadcast signal is transmitted with a 27 MHZ frequency band at a transmission rate of 42.192 Mbps (including a Viterbi error correction code) or 31.644 Mbps (excluding it). In a digital cable broadcast of which such a digital CS broadcast is re-transmitted, since the transmission frequency band is 6 MHZ and C/N of the cable broadcast is sufficiently better than that of the CS broadcast, the 64-symbol QAM that does not include the Viterbi code is used as a modulation method.

QAM is a digital modulation method referred to as orthogonal amplitude modulation method of which two orthogonal carriers (I and Q) are digital-amplitude modulated with many symbols and then two carriers I and Q are added. In the 64-symbol QAM method, I and Q are digital-amplitude modulated with eight symbols each and thereby 64 symbols of data are placed on the IQ plane. When data at 31.644 Mbps is modulated with 64 QAM method, the data can be transmitted with a transmission frequency band of 6 MHz for the cable broadcast.

However, in the digital CS broadcast whose transmission output power is becoming strong, it is considered to raise the data transmission rate with a tradeoff of the rate of the Viterbi code. In this situation, when a transmission signal is re-transmitted with a digital cable broadcast, the following problem will take place. In other words, when 64-symbol QAM is used, the transmission signal exceeds the 6 MHz band.

In such a case, the modulator 45 shown in FIG. 13 should use other than 64-symbol QAM (namely, 128 QAM or 256 QAM). FIGS. 14A, 14B, and 14C show data arrangements on QI plane of digital signals modulated corresponding to 64 QAM, 128 QAM, and 256 QAM, respectively.

When a digital service such as a digital BS broadcast or a ground wave digital broadcast other than the digital CS broadcast is performed, in a digital cable broadcast of which the digital service is re-transmitted, a modulation method other than 64-symbol QAM may be required.

Figure 15:
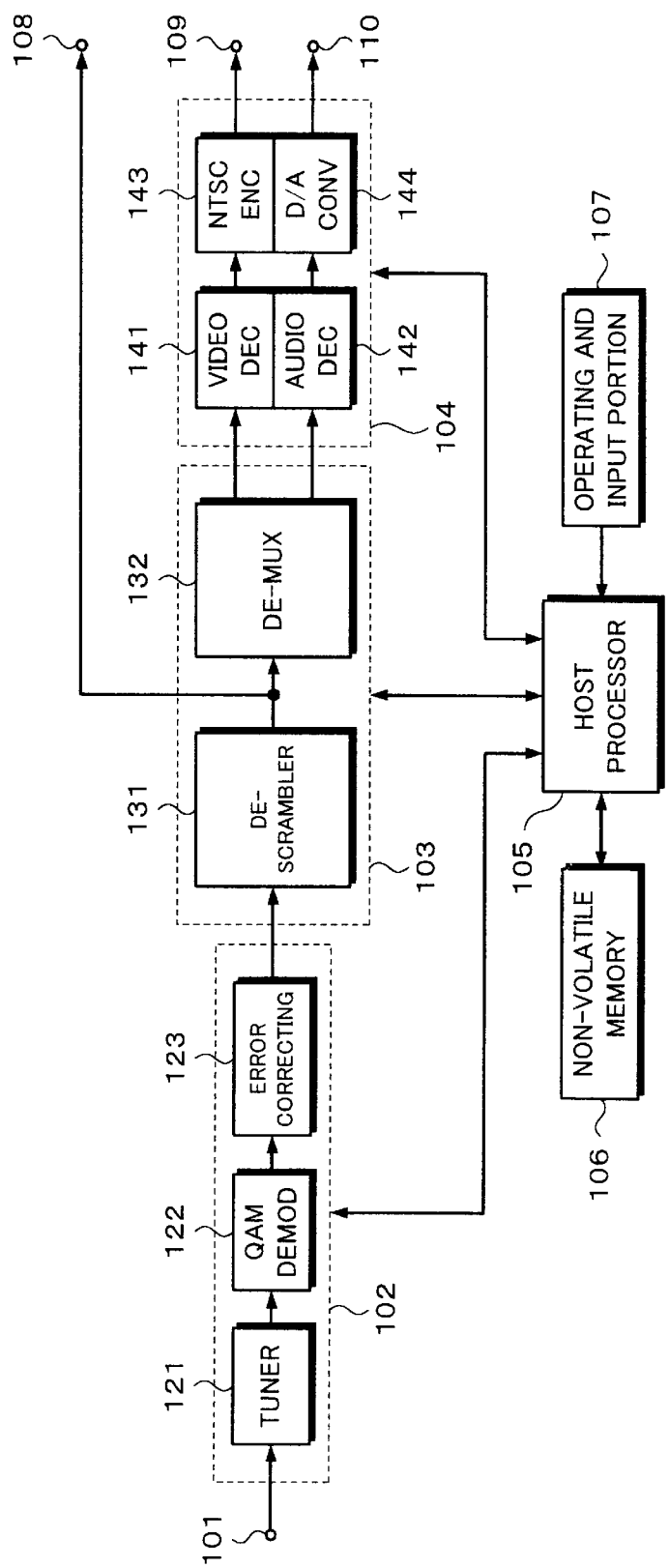
FIG. 15 is a block diagram showing an example of the overall structure of an embodiment of the present invention.

FIG. 15 is a block diagram showing an example of the overall structure of a digital cable broadcast receiving apparatus according to an embodiment of the present invention. Referring to FIG. 15, a digital cable broadcast signal is input to a front end portion 102 through an input terminal 101 connected to a coaxial cable of a digital cable broadcast network. The front end portion 102 selects a predetermined carrier wave from the received signal corresponding to control information received from a host processor 105.

In addition, the front end portion 102 performs a demodulation process corresponding to the modulation process performed on the transmitter side (64-symbol QAM, 128-symbol QAM, 256-symbol QAM, or the like) and performs an error correction process corresponding to the encode process performed on the transmitter side. The front end portion 102 supplies the resultant signal as a transport stream to a transport portion 103. The transport portion 103 comprises a de-scrambler 131 and a de-multiplexer 132. When separated signal components have been scrambled on the transmitter side, the de-scrambler 131 de-scrambles the signal components corresponding to control information received from the host processor 105. Thus, video data and/or audio data that has been compressed corresponding to MPEG is restored.

An output signal of the de-scrambler 131 is supplied to the de-multiplexer 132. The de-multiplexer 132 separates and extracts required packets for video data and/or audio data from the output signal of the de-scrambler 131 corresponding to control information received from the host processor 105. Thus, packets referred to as PES (Packetized Elementary Stream) of a desired channel are separated from multiplexed channels of the transport stream.

As the result of the process of the transport portion 103, video data and/or audio data of the separated channel and that has been compressed corresponding to MPEG are supplied to an MPEG decode portion 104. The MPEG decode portion 104 performs a decode process corresponding to control information received from the host processor 105 and generates an analog video signal and an analog audio signal. The MPEG decode portion 104 comprises a video decoder 141, an audio decoder 142, an NTSC encoder 143, and a D/A converter 144. PES packets separated by the de-multiplexer 132 are supplied to the video decoder 141 and/or the audio decoder 142.

The video decoder 141 decodes the signal that has been compressed corresponding to MPEG and supplies the decoded signal to the NTSC encoder 143. The NTSC encoder 143 generates a reproduced video signal. The reproduced video signal is obtained through an output terminal 109. On the other hand, the audio decoder 142 generates a digital audio signal. The digital audio signal is supplied to the D/A converter 144. The D/A converter 144 generates reproduced analog audio signals of left and right channels. The reproduced analog audio signals are obtained through an output terminal 110.

The reproduced video signal and the reproduced audio signals obtained through the output terminals 109 and 110 are supplied to an RF modulator (not shown). The RF modulator modulates the reproduced video signal and the reproduced audio signal with a radio frequency signal and generates a reproduced television signal. The reproduced television signal is supplied to an antenna terminal of a television receiver.

The host processor 105 (which controls all portions of the apparatus), the front end portion 102, the transport portion 103, and the MPEG decode portion 104 are connected with a bus so that data can be bidirectionally exchanged thereamong. An operation and input portion 107 is connected to the host processor 105. The operation and input portion 107 has various set keys, ten keys, and so forth. Set information is supplied from the operation and input portion 107 to the host processor 105. Thus, the host processor 105 stores set information corresponding to the operation state of the operation and input portion 107 to a non-volatile memory 106. When necessary, the host processor 105 reads data from the non-volatile memory 106, generates control information, and supplies the generated control information to the individual portions of the apparatus so as to centrally control them.

Next, the front end portion 102 will be described in detail. The front end portion 102 comprises a tuner 121, a QAM demodulating circuit 122, and an error correcting circuit 123. The tuner 121 receives a digital cable broadcast signal through the input terminal 101, selects a desired carrier wave from the received signal, and converts the selected carrier wave into an intermediate frequency signal. The intermediate frequency signal is supplied from the tuner 121 to the QAM demodulating circuit 122. The QAM demodulating circuit 122 performs a QAM demodulation process for the intermediate frequency signal corresponding to the modulation process performed on the transmitter side and generates base band digital data. The base band digital data is supplied from the QAM demodulating circuit 122 to the error correcting circuit 123. The error correcting circuit 123 performs an error correction process for the received digital data corresponding to the encode process performed on the transmitter side. As an output signal of the error correcting circuit 123, a transport stream is generated.

In reality, the transport stream that is output from the front end portion 102 is a bit stream corresponding to MPEG as described above. In other words, the transport stream is composed of a set of 188-byte fixed length packets. Each of the packets is composed of a header, an adaptation field, and a payload. The adaptation field is used for additional information. The payload is used for data (video data/audio data, and so forth) of the current packet. The header is composed of four bytes. The header starts with a synchronous byte. The header represents control information of PID (Packet ID), presence/absence of scrambling state of data, and presence/absence of adaptation field and payload.

The de-scrambler 131 de-scrambles each packet corresponding to the control information. The de-multiplexer 132 separates and extracts required packets for video data and/or audio data. Each packet separated and extracted by the de-multiplexer 132 is supplied to the MPEG decoding portion 104. An output signal of the de-scrambler 131 is obtained as high speed data through a terminal 108.

Next, an EPG display process of the receiving apparatus will be described. As described above, although NIT is changed corresponding to such as re-transmission conditions, PAT/PIT is not changed. In other words, PAT/PIT contained in a TS packet received from the satellite 1 is used as it is. Thus, there may be services listed in only PAT and/or EIT, not in NIT. Unless the handling of such services is clearly defined, the receiving apparatuses STB $5_1$ to $5_m$ may malfunction. For example, the process speeds of the receiving apparatuses STB $5_1$ to $5_m$ may deteriorate. In addition, as was described with reference to FIG. 11, only services searched from those listed in NIT can be provided to the users. Thus, services not listed in NIT cannot be provided to the users. Consequently, if EPG is displayed corresponding to EIT, since services that are not provided to the users are displayed, the users will get confused.

Thus, according to the present invention, when there are services listed in only PAT and/or EIT, not in NIT, the STB $5_1$ to $5_m$ perform the EPG display process with information listed in NIT. Thus, services listed in only PAT and/or EIT are neither displayed nor selected.

Figure 16:
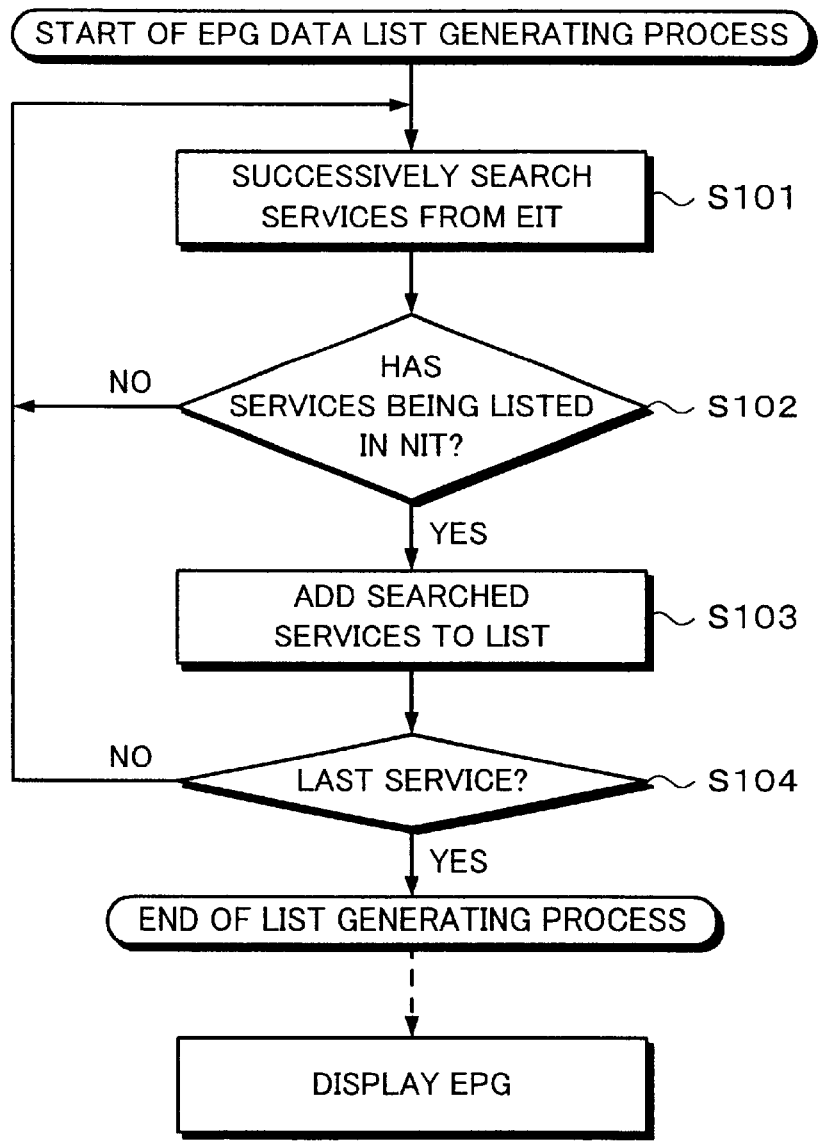
FIG. 16 is a flow chart for explaining a process of the embodiment of the present invention.

Next, with reference to a flow chart shown in FIG. 16, the operation of the embodiment of the present invention will be described. The process shown in FIG. 16 is performed by for example the host processor 105. At step S101, services listed in EIT are successively searched. Thereafter, at step S102, it is determined whether or not services searched at step S101 are listed in NIT. When the determined result at step S102 is Yes, the flow advances to step S103. Otherwise, the flow returns to step S101. At step S101, services listed in EIT1 are searched. At step S103, the searched services are appended to a predetermined list. Thereafter, at step S104, it is determined whether or not the searched service is the last service listed in EIT. When the determined result at step S104 is Yes, the list display process is completed. Otherwise, the flow returns to step S101. At step S101, services listed in the next EIT1 are searched.

The list has only services contained in NIT. Thus, when EPG is displayed corresponding to the list, only services contained in PAT and/or EIT are prevented from being displayed on EPG. Next, with reference to FIGS. 17A, 17B, 17C, and 18, the EPG display process will be described. FIG. 17A shows services listed in NIT. FIG. 17B and 17C show services listed in PAT and/or EIT. The relation between the services listed in NIT and PAT and/or EIT shown in FIGS. 17A, 17B, and 17C represents the following points (1) and (2).

(1) Although a service of channel 444 is listed in NIT, it is not listed in PAT and/or EIT.

(2) Although services of channels 222 and 555 are listed in PAT and/or EIT, they are not listed in NIT.

FIG. 18 shows EPG generated and displayed in the method shown in FIG. 16. Corresponding to the point (2), channel 222 and channel 555 are not displayed on EPG. In other words, channels listed in only PAT and/or EIT, not in NIT are prevented from being displayed on EPG.

Corresponding to the point (1), it is determined that channel 444 is not serviced. A relevant message is displayed on EPG as with the above-described example shown in FIGS. 11A, 11B, 11C, and 12.

Figure 19:
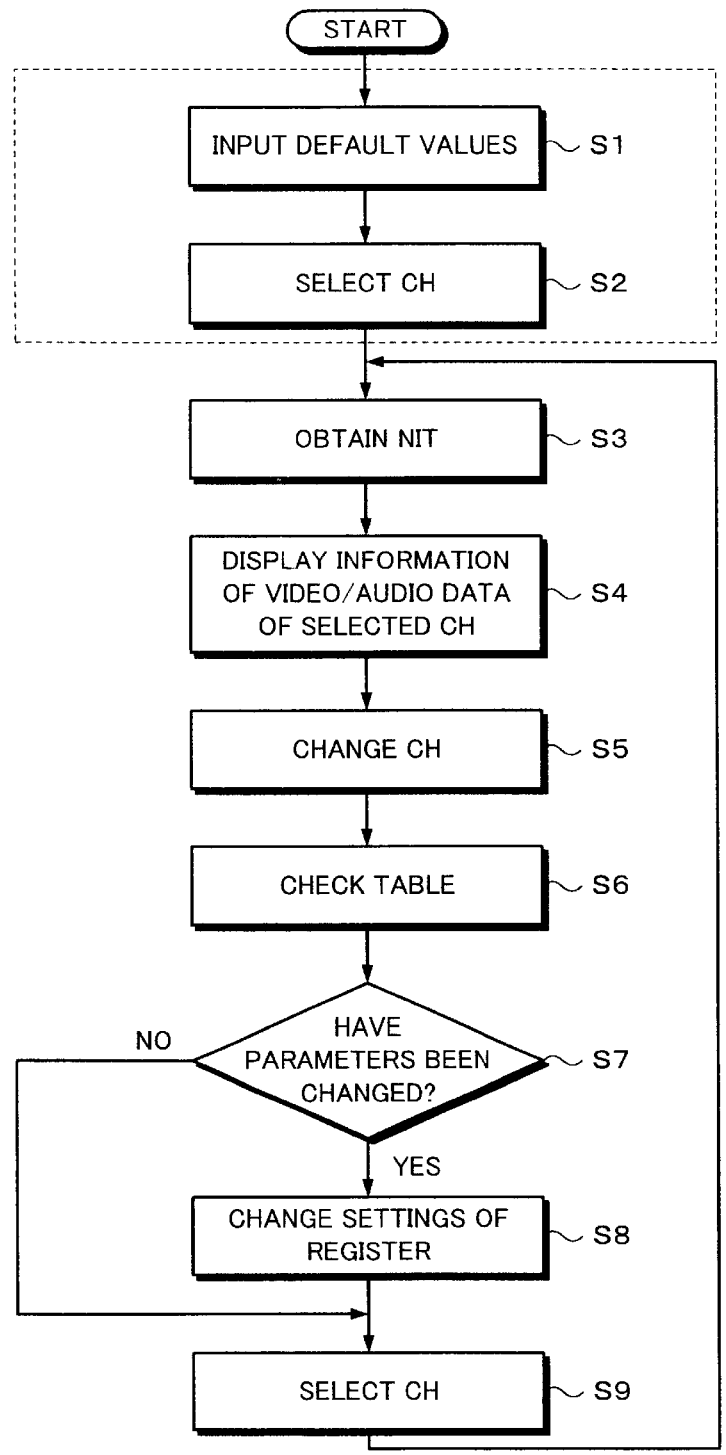
FIG. 19 is a flow chart for explaining an example of a program selection process according to the present invention.

Next, a program selection process of a receiving apparatus in the case that signals are broadcast with a plurality of modulating methods as described above will be described. In the program selection process, an information table referred to as NIT (Network Information Table) should be obtained from PSI (Program Specific Information) of a transport stream. NIT lists transmission factors (carrier frequency, convolution rate, modulation method, and so forth) for each carrier wave and all digital transmission channels multiplexed thereto. However, since a channel on which NIT is transmitted and the modulation method used thereon may vary for each cable television provider, they are not uniquely defined. To solve such a problem, when the user purchases a receiving apparatus and then makes a subscription contract with a cable television provider, the user will obtain a channel number (or frequency) on which NIT is transmitted and the modulation method used on the channel from the cable television provider and the input such information to the receiving apparatus. FIG. 19 is a flow chart showing such a process.

FIG. 19 is a flow chart showing an example of the program selection process. The process shown in FIG. 19 is performed by for example the host processor 105. The user inputs reception parameters (channel number or frequency, modulation method, and so forth) obtained from a cable television provider as default values (at step S1). Corresponding to the reception parameters that are input at step S1, a channel is selected (at step S2). NIT is separated and extracted from a transport stream of the channel selected at step S2. NIT is stored to the non-volatile memory 6. Thus, NIT is obtained (at step S3). Thereafter, information of video/audio data of the selected channel is displayed.

When the user issues a channel change command to the apparatus with the operation and input portion 7, the reception parameters of the new channel corresponding to the changed channel command are checked with reference to NIT (at step S6). Thereafter, it is determined whether or not the reception parameters should be changed (at step S7). When the determined result at step S7 is Yes, the flow advances to step S8. Otherwise, the flow advances to step S9. At step S8, the settings of the register of the processor 5 are changed so as to control the front end portion 2. Thereafter, the flow advances to step S9. At step S9, the program selection process is performed with the register control information that is changed or held corresponding to the determined result at step S7. Thereafter, the flow returns to step S3.

In the above-described process, as a channel is changed, reception parameters are set for the front end portion 2. Thus, corresponding to the channel change command, a relevant digital cable broadcast signal can be accurately received. Consequently, the user can seamlessly change a channel without need to consider a change of reception parameters. In addition, as long as the transmitter side changes reception parameters (such as a frequency), with reference to NIT stored in the non-volatile memory 6, a digital cable broadcast signal can be accurately received. Thus, unless the transmitter side changes reception parameters such as a frequency, when the user initially inputs default values to the receiving apparatus, all of available channels can be accurately received. In other words, unless the transmitter side changes reception parameters such as a frequency, it is not necessary to repeatedly perform a block of steps S1 and S2 shown in FIG. 19, but one time.

When the power of the receiving apparatus is turned off, NIT obtained at step S3 is stored in the non-volatile memory 6. Thus, when the power of the receiving apparatus is turned on, with information that is read from the non-volatile memory 6, the program selection process can be performed.

If the transmitter side changes reception parameters such as a frequency due to a particular reason, when the provider informs the user of the changed reception parameters and the user inputs new default values corresponding to the changed reception parameters to the receiving apparatus (namely, the block of steps S1 and S2 is performed with the new default values), a reception disable state can be prevented from taking place in the receiving apparatus.

In addition, since unused channels vary for each cable broadcast provider, service channels may vary for each broadcast provider. In such a situation, when the above-described process shown in FIG. 19 is performed, the receiving apparatus can receive services from any provider.

In FIG. 19, after a channel is selected at step S9, the flow returns to step S3. At step S3, NIT is obtained again. Alternatively, after step S9, the flow may return to step S4. In this case, as with steps S1 and S2, unless the transmitter side changes reception parameters such as a frequency, it is not necessary to repeatedly obtain NIT. Thus, the process becomes simple. However, in this case, while the user is watching a program of a particular channel, if reception parameters of other channels are changed, new NIT cannot be obtained. Thus, it is necessary to repeatedly input default values at step SI.

Figure 20:
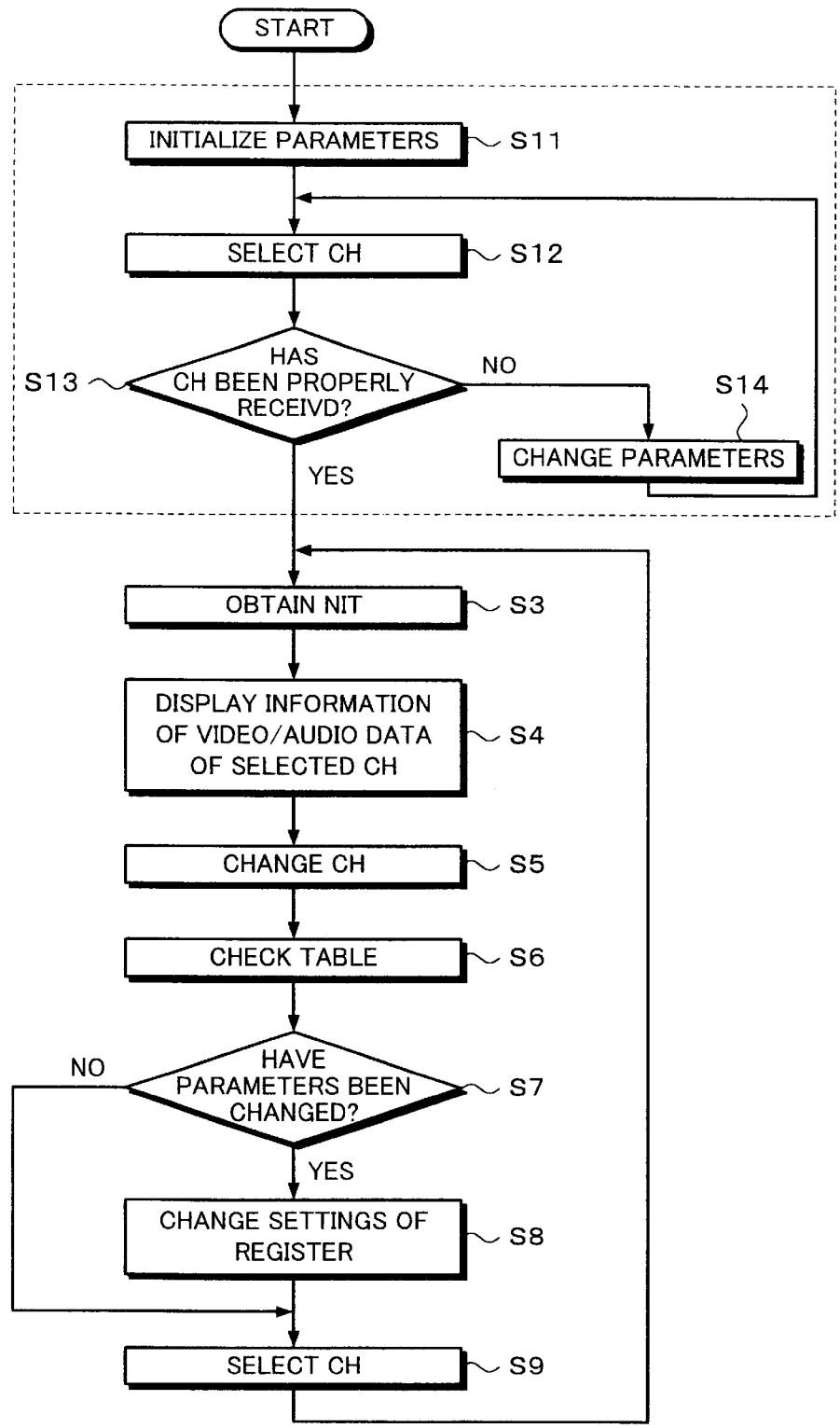
FIG. 20 is a flow chart for explaining another example of the program selection process according to the present invention.

Next, another example (second example) of the channel selection process will be described. FIG. 20 is a flow chart showing the second example of the channel selection process. For simplicity, in FIG. 20, similar steps to those in FIG. 19 are denoted by similar step numbers. In FIG. 20, at steps S11, S12, S13, and S14 as a block denoted by dotted lines, a process for obtaining NIT is performed. As with the case shown in FIG. 19, unless the transmitter side changes reception parameters such as a frequency, it is necessary to repeatedly perform the block, but one time.

In other words, at step S11, reception parameters such as a frequency are initialized. At step S12, a channel is selected. Thereafter, the flow advances to step S13. At step S13, it is determined whether or not a channel has been properly selected. When the determined result at step S13 is Yes, the flow advances to step S3. Otherwise, the flow advances to step S14. At step S14, parameters are changed.

In other words, at step S14, reception parameters stored at a predetermined memory such as the non-volatile memory 6 before shipment are successively set. Thereafter, the flow advances to step S12. At step S12, a channel is selected with the reception parameters set at step S14. Reception parameters as combinations of all frequencies and modulation methods are pre-stored in the predetermined memory such as the non-volatile memory 6. Until channels are properly selected, they are automatically searched corresponding to the proper reception parameters.

The other steps after step S3 are the same as those according to the embodiment of the present invention shown in FIG. 19. In other words, as with the above-described (first) example, when the determined result at step S13 is Yes, NIT is obtained.

Corresponding to the obtained NIT, channels are automatically changed.

In the second example, the user does not need to input default values unlike with the first example.

In the first example and the second example, signals modulated corresponding to 64-symbol QAM, 128-symbol QAM, and 256-symbol QAM as different modulation methods are supplied. However, it should be noted that the present invention can be applied to other modulation methods.

In the above-described embodiment, the present invention is applied to a digital cable broadcast of which a digital CS broadcast signal is re-transmitted. However, the present invention can be applied to a digital cable broadcast of which a digital BS broadcast signal or a digital ground broadcast signal is re-transmitted.

According to the present invention, a list having only services contained in an information table such as NIT having the relation between physical information of transmission paths and deliverable data in services contained in an information table such as PAT and/or EIT having deliverable data is generated. Corresponding to the list, EPG is displayed.

Thus, services listed in PAT and/or EIT, not in NIT can be clearly handled.

Consequently, a trouble that takes place in the case that there are services listed in PAT and/or EIT, not NIT can be prevented. For example, a malfunction of which undeliverable services that are not listed in NIT are displayed can be prevented. In addition, a trouble of which the operation of STB delays can be prevented.

Although the present invention has been shown and described with respect to a best mode embodiment thereof, it should be understood by those skilled in the art that the foregoing and various other changes, omissions, and additions in the form and detail thereof may be made therein without departing from the spirit and scope of the present invention.

What is claimed is:

1. A digital signal receiving apparatus for receiving a digital broadcast signal having a first information table and a second information table, the first information table representing a relation between physical information of transmission paths and first deliverable services, the second information table representing second deliverable services, the apparatus comprising:

means for searching the second information table to determine those second deliverable services also represented on the first information table;

means for generating a list that represents those first deliverable services represented only on the first information table and those second deliverable services also represented on the first information table; and means for performing a predetermined process corresponding to the generated list.

2. The digital signal receiving apparatus as set forth in claim 1, wherein the predetermined process is a process for displaying information of the deliverable service to the user.

3. The digital signal receiving apparatus as set forth in claim 1, wherein the digital broadcast signal is a digital satellite broadcast signal, and wherein the first information table is a Network Information Table (NIT).

4. The digital signal receiving apparatus as set forth in claim 1, wherein the digital broadcast signal is a digital satellite broadcast signal, and wherein the second information table is at least a Program Association Table (PAT) or an Event Information Table (EIT).

5. A digital signal receiving method for receiving a digital broadcast signal having a first information table and a second information table, the first information table representing a relation between physical information of transmission paths and first deliverable services, the second information table representing second deliverable services, the method comprising:

(a) searching the second information table to determine those second deliverable services also represented on the first information table;

(b) generating a list that represents those first deliverable services represented only on the first information table and those second deliverable services determined in step (a); and (c) performing a predetermined process corresponding to the generated list.

6. The digital signal receiving method as set forth in claim 5, wherein the predetermined process is a process for displaying information of the deliverable service to the user.

7. The digital signal receiving method as set forth in claim 5, wherein the digital broadcast signal is a digital satellite broadcast signal, and wherein the first information table is a Network Information Table (NIT).

8. The digital signal receiving method as set forth in claim 5, wherein the digital broadcast signal is a digital satellite broadcast signal, and wherein the second information table is at least a Program Association Table (PAT) or an Event Information Table (EIT).

9. A broadcast receiver, comprising:

a front-end for receiving a digital broadcast signal having a Network Information Table (NIT) and at least a Program Association Table (PAT);

a memory for storing the NIT and the PAT; and a processor for creating a list of services for display from the stored NIT and the stored PAT such that the list consists of services listed only on the NIT and services listed on both the NIT and the PAT.

* * * * *

UNITED STATES PATENT AND TRADEMARK OFFICE
CERTIFICATE OF CORRECTION

PATENT NO.   : 6,691,311 B1
DATED        : February 10, 2004
INVENTOR(S)  : Haruhiko Yata, Yuichiro Nakamura and Hirofumi Yuchi It is certified that error appears in the above-identified patent and that said Letters Patent is hereby corrected as shown below:

Column 3,
Line 3, after "$6_2$", insert -- ,..., --.

Column 13,
Line 12, delete the paragraph break following the words "is obtained."

Signed and Sealed this

Eighteenth Day of May, 2004

JON W. DUDAS
*Acting Director of the United States Patent and Trademark Office*